United States Patent
Zheng et al.

(10) Patent No.: US 10,339,146 B2
(45) Date of Patent: Jul. 2, 2019

(54) DEVICE AND METHOD FOR PROVIDING MEDIA RESOURCE

(71) Applicant: SAMSUNG ELECTRONICS CO., LTD., Suwon-si (KR)

(72) Inventors: Xuan Zheng, Nanjing (CN); Jie Chen, Nanjing (CN); Bing Ji, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 615 days.

(21) Appl. No.: 14/952,402

(22) Filed: Nov. 25, 2015

(65) Prior Publication Data
US 2016/0147768 A1 May 26, 2016

(30) Foreign Application Priority Data

Nov. 25, 2014 (CN) .......................... 2014 1 0687895
Jul. 14, 2015 (KR) ........................ 10-2015-0099839

(51) Int. Cl.
*G06F 16/48* (2019.01)
*G06F 16/9535* (2019.01)
(Continued)

(52) U.S. Cl.
CPC ...... *G06F 16/24578* (2019.01); *G06F 16/285* (2019.01); *G06F 16/435* (2019.01); *G06F 16/48* (2019.01); *G06F 16/9535* (2019.01)

(58) Field of Classification Search
CPC ........... G06F 17/3053; G06F 17/30867; G06F 17/30598; G06F 17/30; G06F 17/30038;
(Continued)

(56) References Cited

U.S. PATENT DOCUMENTS

2003/0105589 A1* 6/2003 Liu .................. G06F 17/30017
702/1
2004/0199657 A1* 10/2004 Eyal ................. G06F 17/30038
709/231
(Continued)

FOREIGN PATENT DOCUMENTS

CN 1920818 A 2/2007
CN 101334796 A 12/2008
(Continued)

OTHER PUBLICATIONS

Communication dated Apr. 14, 2016, issued by the European Patent Office in counterpart European Patent Application No. 15195889.9.
(Continued)

*Primary Examiner* — Robert W Beausoliel, Jr.
*Assistant Examiner* — Pedro J Santos
(74) *Attorney, Agent, or Firm* — Sughrue Mion, PLLC

(57) ABSTRACT

Provided is a display device for providing a media resource. The display device includes a communicator and a controller. The communicator collects background media resource database (DB) information. The controller extracts text information from each of media resources included in a background media resource DB, acquires one or more feature words based on the extracted text information, generates a feature word weight matrix of the background media resource DB which includes a respective weight of each acquired feature word, calculates a clustering similarity between each media resource included in the background media resource DB and a current media resource, which is being watched by a user, by using the feature word weight matrix, and provides a media resource recommendation list which includes one or more media resources based on the clustering similarity.

17 Claims, 11 Drawing Sheets

(51) Int. Cl.
*G06F 16/435* (2019.01)
*G06F 16/2457* (2019.01)
*G06F 16/28* (2019.01)

(58) Field of Classification Search
CPC ......... G06F 17/30029; G06F 16/24578; G06F 16/435; G06F 16/285; G06F 16/9535; G06F 16/48
USPC .......................... 707/748, 723, 737, 728, 750
See application file for complete search history.

(56) References Cited

U.S. PATENT DOCUMENTS

| | | | | |
|---|---|---|---|---|
| 2008/0114732 | A1* | 5/2008 | Koike | G06F 17/30699 |
| 2008/0140644 | A1* | 6/2008 | Franks | G06F 17/30817 |
| 2008/0204595 | A1* | 8/2008 | Rathod | G06F 17/30796 348/465 |
| 2009/0006368 | A1* | 1/2009 | Mei | G06F 17/30796 |
| 2009/0049082 | A1* | 2/2009 | Slaney | G06F 17/30749 |
| 2010/0076979 | A1 | 3/2010 | Wang et al. | |
| 2011/0022620 | A1 | 1/2011 | Woods | |
| 2012/0215791 | A1* | 8/2012 | Malik | G06F 17/30292 707/749 |
| 2012/0254363 | A1* | 10/2012 | Martin | G06F 17/30029 709/219 |
| 2013/0166590 | A1 | 6/2013 | Kim | |
| 2013/0218905 | A1 | 8/2013 | Sankarasubramaniam et al. | |
| 2014/0108006 | A1 | 4/2014 | Vogel et al. | |
| 2014/0188956 | A1 | 7/2014 | Subba et al. | |
| 2014/0212106 | A1 | 7/2014 | Izo et al. | |
| 2014/0236943 | A1 | 8/2014 | Li et al. | |
| 2014/0280241 | A1* | 9/2014 | Reblitz-Richardson | G06F 17/30327 707/749 |
| 2017/0060870 | A1* | 3/2017 | Checkley | G06F 17/3053 |

FOREIGN PATENT DOCUMENTS

| | | |
|---|---|---|
| CN | 101901249 A | 12/2010 |
| CN | 101923545 A | 12/2010 |
| CN | 101984424 A | 3/2011 |
| CN | 101996191 A | 3/2011 |
| CN | 102262670 A | 11/2011 |
| CN | 102831234 A | 12/2012 |
| CN | 103164471 A | 6/2013 |
| CN | 103501449 A | 1/2014 |
| CN | 103647978 A | 3/2014 |
| CN | 103678431 A | 3/2014 |
| CN | 103678618 A | 3/2014 |
| CN | 103747293 A | 4/2014 |
| CN | 103870607 A | 6/2014 |
| WO | 98/33135 A1 | 7/1998 |

OTHER PUBLICATIONS

Communication dated Mar. 6, 2017 issued by the State Intellectual Property Office of P.R. China in counterpart Chinese Patent Application No. 201410687895.0.

Lei Chen et al., "A Micro blog Recommendation System Based on User Clustering", Information Science and Technology of Chinese, Master's Theses Full-test Database, 2014 International Conference on Computer Science and Electronic Technology (ICCSET 2014), 2014, pp. 408-411, issue 2, Atlantis Press.

* cited by examiner

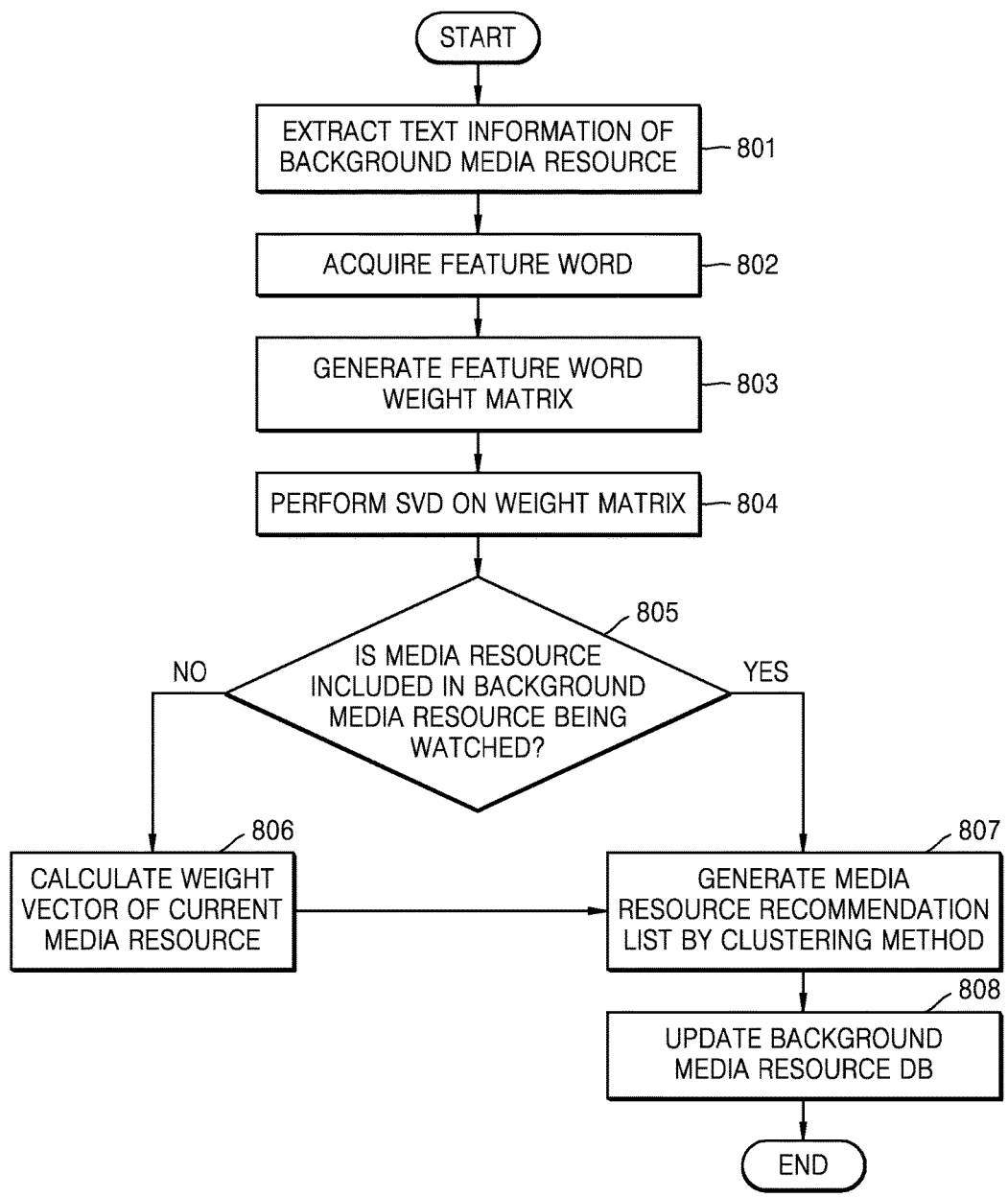

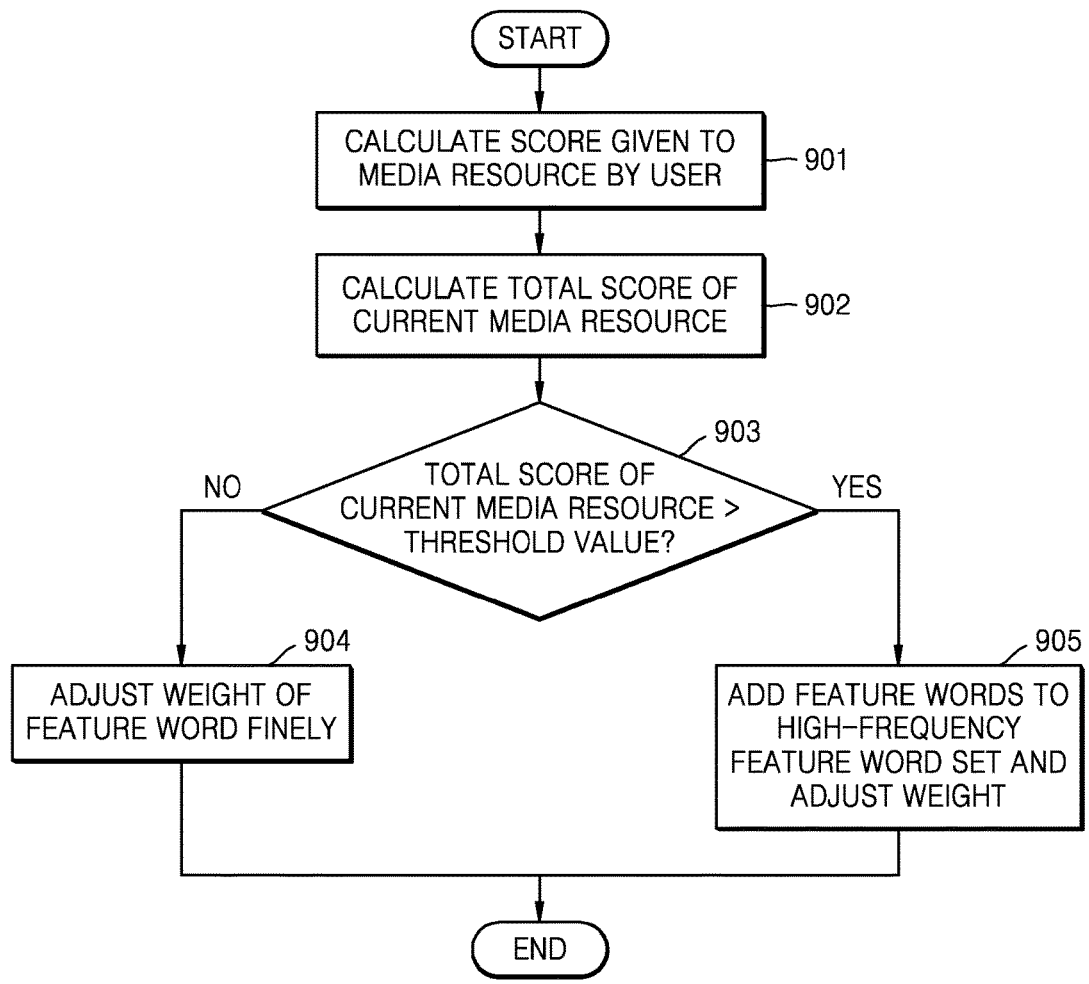

DEVICE AND METHOD FOR PROVIDING MEDIA RESOURCE

CROSS-REFERENCE TO RELATED APPLICATIONS

This application claims priority from Chinese Patent Application No. 201410687895.0, filed on Nov. 25, 2014 in the State Intellectual Property Office (SIPO) of the People's Republic of China, and Korean Patent Application No. 10-2015-0099839, filed on Jul. 14, 2015 in the Korean Intellectual Property Office, the disclosures of which are incorporated herein by reference in their entireties.

BACKGROUND

1. Field

Devices and methods consistent with exemplary embodiments relate to multimedia technology, and more particularly, to devices and methods for providing (or recommending) various types of resources.

2. Description of the Related Art

When watching television (TV), a user may be interested in some information about the current program, or may want to watch other media resources related to the current program. There are several media resource recommending methods in consideration for such a user's requirement. In general, a keyword of the current resource that is being watched by the user may be acquired in order to detect the user's preference. The acquired keyword may be represented as a vector for describing the user's preference and the current resource that is being watched by the user.

However, current media resource recommending methods have many drawbacks. For example, most media resource recommending methods may recommend only the same type of resources and may recommend hardly any other various types of resources. Various resource recommending methods recommend resources unidirectionally. In particular, the various resource recommending methods recommend different types of resources based on one resource. For example, the various resource recommending methods may include methods of recommending video resources related to TV programs and methods of recommending products related to TV programs.

There are few resource recommending methods for recommending various types of resources with reference to each other. Words included in a media resource may be acquired to implement a resource recommending method. The words may be difficult to collect automatically, and may have to be collected manually. An operational process for acquiring the words may be complex, may be limited to morphological information, may lack semantic information, may depend on manual annotation, and may fail to utilize the user's feedback.

SUMMARY

Exemplary embodiments provide devices and methods for providing (or recommending) various types of resources based on a semantic link in a television (TV) as an example of the multimedia technology field.

According to an aspect of an exemplary embodiment, there is provided a display device for providing a media resource, the display device including: a communicator configured to collect background media resource database (DB) information; and a controller configured to extract text information from each of a plurality of media resources included in a background media resource DB, to acquire at least one respective feature word of each corresponding one of the plurality of media resources based on the extracted text information, to generate a feature word weight matrix which includes a respective first weight of each of the at least one respective feature word, to calculate a clustering similarity between each of the plurality of media resources included in the background media resource DB and a current media resource, which is being watched or accessed by a user, by using the feature word weight matrix, and to provide a media resource recommendation list which includes at least one media resource based on the calculated clustering similarity.

The controller may be further configured to extract candidate feature words from each of the plurality of media resources included in the background media resource DB, to calculate a respective second weight of each of the extracted candidate feature words, and to filter the candidate feature words based on the calculated respective second weight of each of the candidate feature words.

The controller may be further configured to divide the extracted text information on a keyword basis, to calculate a term frequency (TF) of each keyword in the background media resource DB, and to extract a keyword having a TF which exceeds a predetermined threshold value as a candidate feature word.

For each of the extracted candidate feature words, the respective second weight may be calculated as the product of an inverse document frequency (IDF) and a term frequency (TF) of the corresponding candidate feature word.

The controller may be further configured to delete, from among the extracted candidate feature words, at least one candidate feature word that corresponds to a keyword included in a preset stop list, and to delete, from among the extracted candidate feature words, at least one candidate feature word that has a respective second weight that is smaller than a preset threshold value.

Each row of the feature word weight matrix may correspond to a respective one of the acquired at least one feature word, each column of the feature word weight matrix may correspond to a respective one of the plurality of media resources of the background media resource DB, each element of the feature word weight matrix may represent the respective first weight of the corresponding feature word, and the element may be set to zero when the corresponding feature word is not a feature word of the corresponding media resource.

When the current media resource is not included in the background media resource DB, the controller may be further configured to acquire at least one feature word of the current media resource based on text information extracted from the current media resource and to generate a feature word weight matrix of the current media resource which includes a respective first weight of each of the acquired at least one feature word of the current media resource.

The controller may be further configured to generate a background media resource set which includes at least one feature word from among the acquired at least one respective feature word, to cluster the generated background media resource set, and to calculate the clustering similarity between each media resource included in the background media resource DB and the current media resource by using a result of the clustering the background media resource set.

The controller may be further configured to adjust at least one first weight of the feature word weight matrix based on a user input that relates to the provided media resource recommendation list.

According to an aspect of another exemplary embodiment, there is provided a method for providing a media resource, the method including: extracting text information from each of a plurality of media resources included in a background media resource DB; acquiring at least one feature word of each corresponding one of the plurality of media resources based on the extracted text information; generating a feature word weight matrix which includes a respective first weight of each of the at least one respective feature word; calculating a clustering similarity between each of the plurality of media resources included in the background media resource DB and a current media resource, which is being watched or accessed by a user, by using the feature word weight matrix; and providing a media resource recommendation list which includes at least one media resource based on the calculated clustering similarity.

The acquiring the at least one respective feature word may include: extracting candidate feature words from each of the plurality of media resources included in the background media resource DB; calculating a respective second weight of each of the extracted candidate feature words; and filtering the candidate feature words based on the calculated respective second weight of each of the candidate feature words.

The extracting the candidate feature words may include: dividing the extracted text information on a keyword basis; calculating a TF of each keyword in the background media resource DB; and extracting a keyword having the TF which exceeds a predetermined threshold value as a candidate feature word.

For each of the extracted candidate feature words, the respective second weight may be calculated as the product of an IDF and a TF of the corresponding candidate feature word.

The filtering the candidate feature words may include: deleting, from among the extracted candidate feature words, at least one candidate feature word that corresponds to a keyword included in a preset stop list; and deleting, from among the extracted candidate feature words, at least one candidate feature word that has a respective second weight that is smaller than a preset threshold value.

Each row of the feature word weight matrix may correspond to a respective one of the acquired at least one feature word, each column of the feature word weight matrix may correspond to a respective one of the plurality of media resources of the background media resource DB, each element of the feature word weight matrix may represent the respective first weight of the corresponding feature word, and the element may be set to zero when the corresponding feature word is not a feature word of the corresponding media resource.

When the current media resource is not included in the background media resource DB, the calculating the clustering similarity may include: extracting text information of the current media resource; acquiring at least one feature word of the current media resource based on the text information extracted from the current media resource; and generating a feature word weight matrix of the current media resource which includes a respective first weight of each of the acquired at least one feature word of the current media resource.

The calculating the clustering similarity may include: generating a background media resource set which includes at least one feature word from among the acquired at least one respective feature word; clustering the generated background media resource set; and calculating the clustering similarity between each media resource included in the background media resource DB and the current media resource by using a result of the clustering the background media resource set.

The providing the media resource recommendation list may include adjusting at least one first weight of the feature word weight matrix based on a user input that relates to the media resource recommendation list.

According to an aspect of another exemplary embodiment, there is provided a non-transitory computer-readable recording medium has recorded thereon a program which includes commands for executing the above media resource providing method.

BRIEF DESCRIPTION OF THE DRAWINGS

The above and/or other aspects will become apparent and more readily appreciated from the following description of exemplary embodiments, taken in conjunction with the accompanying drawings in which:

FIG. 8 is a flowchart illustrating a media resource recommending method, according to an exemplary embodiment; and FIG. 9 is a flowchart illustrating a feedback-based media resource recommending method, according to an exemplary embodiment.

DETAILED DESCRIPTION

Figure 1:
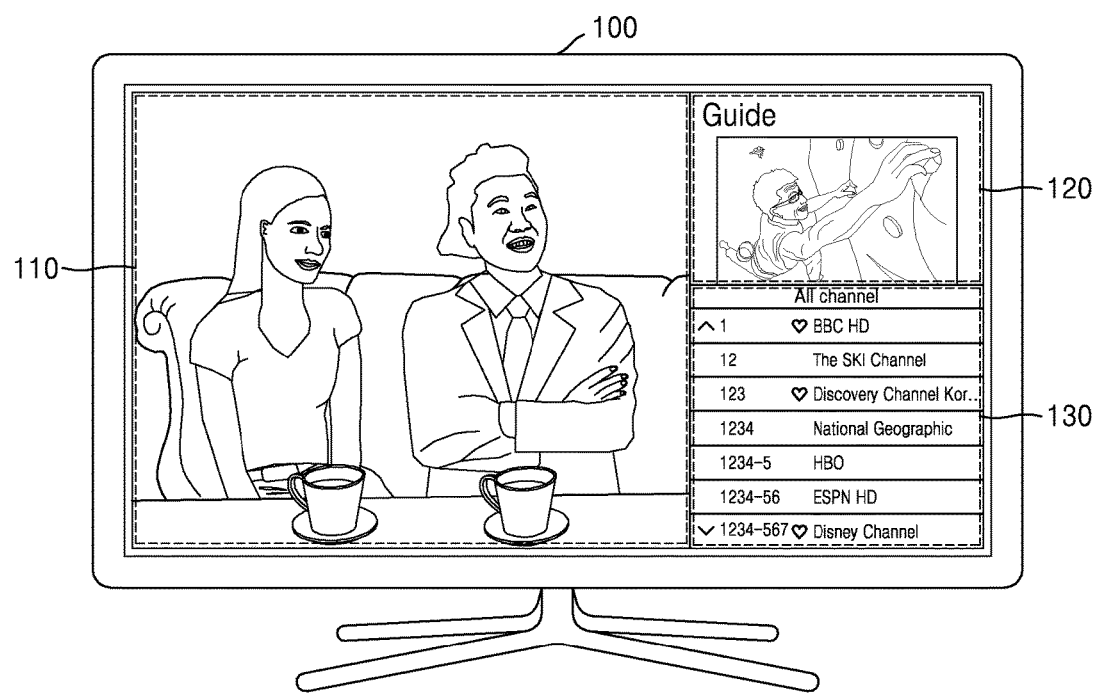
FIG. 1 is a diagram illustrating an exemplary embodiment in which a system provides a current media resource and provides information about another media resource.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

Media resource recommending devices described herein may include, for example, any one or more of analog televisions (TVs), digital TVs, three-dimensional (3D) TVs, smart TVs, light-emitting diode (LED) TVs, organic light-emitting diode (OLED) TVs, plasma TVs, and monitors. Further, those of ordinary skill in the art may easily understand that the media resource recommending devices described herein may also include, for example, any one or more of desktop computers, portable phones, smart phones, tablet personal computers (PCs), notebook computers (or laptop computers), digital broadcasting terminals, personal digital assistants (PDAs), portable multimedia players (PMPs), and navigation devices.

FIG. 1 is a diagram illustrating an exemplary embodiment in which a system provides a current media resource and provides information about another media resource. Referring to FIG. 1, the system may include a TV 100. In an exemplary embodiment, the system may further include a set-top box (not illustrated). The TV 100 and the set-top box may be connected wirelessly or by wire. In an exemplary embodiment, the TV 100 may include the set-top box, or may be designed and programmed to also function as the set-top box.

The TV 100 may provide a current media resource 110 to a user via a screen. Further, the TV 100 may provide information about another media resource 120 to the user by using a portion of the screen or all of the screen.

Herein, the media resources may include any of TV programs, movies, and any other content that may be played by TVs. Further, a background media resource database (DB) may include a set of media resources stored in an external server including media resources that may be played by TVs. In an exemplary embodiment, by providing the information about the other media resource 120, the TV 100 may recommend the other media resource 120 which is related to the current media resource 110.

In an exemplary embodiment, when the user watches the current media resource on the TV, various resources of the background media resource DB may be provided to the user. For example, based on a clustering similarity with respect to the current media resource 110, L background media resources having a relatively high similarity with the current media resource 110 may be provided to the user. For example, a media resource recommendation list 130 which includes the other media resource 120 that has a relatively high similarity with the current media resource 110 may be provided to the user. Thus, the user may easily select and watch the background media resource related to the current media resource 110.

Figure 2:
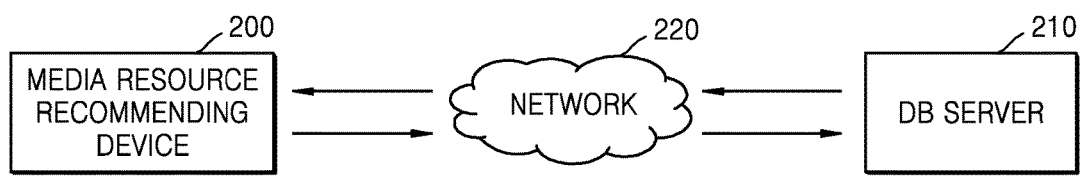
FIG. 2 is a diagram illustrating a media resource recommending system, according to an exemplary embodiment.

FIG. 2 is a diagram illustrating a media resource recommending system, according to an exemplary embodiment. Referring to FIG. 2, the media resource recommending system may include a media resource recommending device 200 and a database (DB) server 210 that may communicate via a network 220.

The network 220 may include a communication network. The communication network may include at least one of a computer network, the Internet, the Internet of Things (IoT), and a telephone network.

Those of ordinary skill in the art may easily understand that the media resource recommending device 200 in the media resource recommending system illustrated in FIG. 2 may include, for example, any one or more of an analog TV, a digital TV, a 3D TV, a smart TV, an LED TV, an OLED TV, a plasma TV, or a monitor, but is not limited thereto. In an exemplary embodiment, the media resource recommending device 200 may correspond to the TV 100 of FIG. 1.

In an exemplary embodiment, the media resource recommending device 200 may provide the current media resource 110 to the user. The DB server 210 may include a background media resource DB. The media resource recommending device 200 and the DB server 210 may share information about the background media resource DB and the current media resource 110 via the network 220.

In an exemplary embodiment, the media resource recommendation list 130 may be generated by the media resource recommending device 200. In another exemplary embodiment, the media resource recommendation list 130 may be generated by the DB server 210. The media resource recommending device 200 and the DB server 210 may share information about the generated media resource recommendation list 130 via the network 220. The generated media resource recommendation list 130 may be provided to the user via the media resource recommending device 200.

Figure 3A:
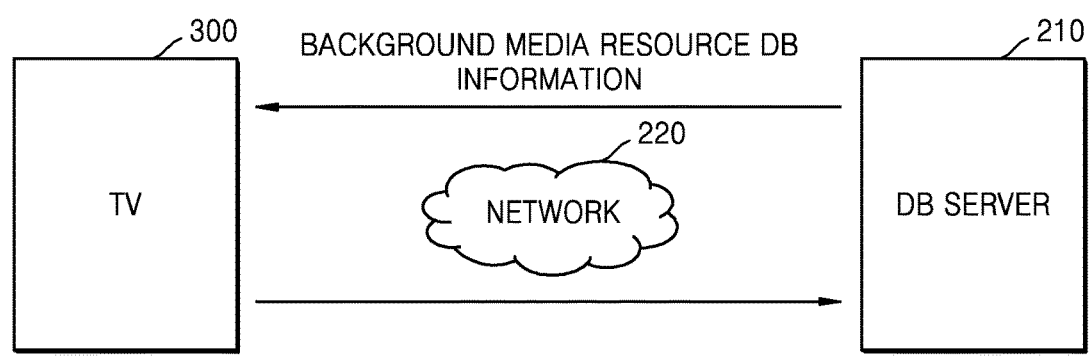
FIGS. 3A, 3B, and 3C are diagrams illustrating media resource recommending systems, according to exemplary embodiments.
Figure 3B:
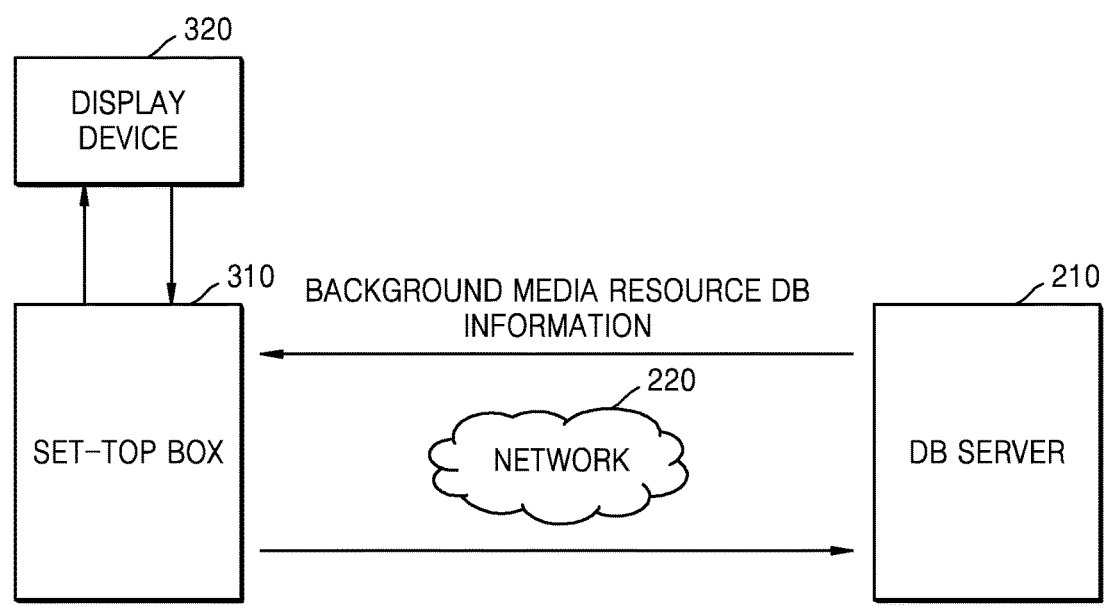
Figure 3C:
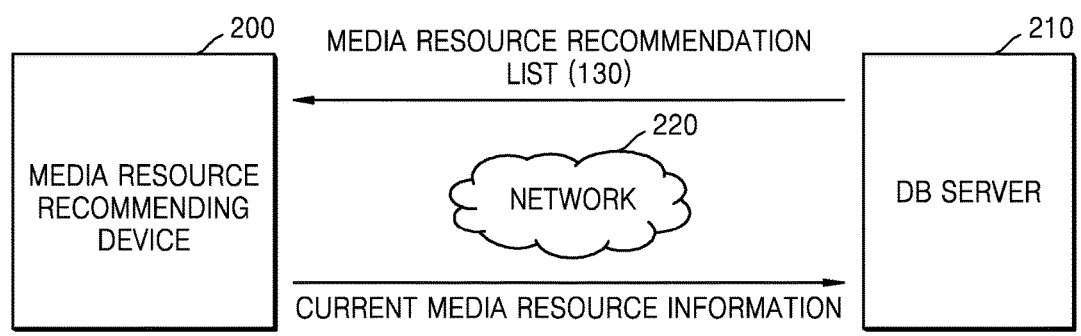

FIGS. 3A, 3B, and 3C are diagrams illustrating media resource recommending systems, according to exemplary embodiments. FIG. 3A is a diagram illustrating a media resource recommending system which includes a network 220, a TV 300, and a DB server 210. The TV 300 of FIG. 3A may correspond to the media resource recommending device 200 of FIG. 2 and the TV 100 of FIG. 1.

In an exemplary embodiment, the TV 300 may acquire information about the background media resource DB from the DB server 210 via the network 220. The TV 300 may recommend a media resource by using the current media resource 110 and background media resource DB information. For example, the TV 300 may generate the media resource recommendation list 130 based on the similarity between the current media resource 110 and the media resource included in the background media resource DB.

The TV 300 may provide the generated media resource recommendation list 130 to the user. Further, the TV 300 may transmit the media resource recommendation list 130 to the DB server 210 via the network 220. In an exemplary embodiment, the TV 300 and the DB server 210 may share information about the generated media resource recommendation list 130. In this case, the DB server 210 may improve a recommendation performance by combining information related to the media resource recommendation list 130 which is received from one or more other media resource recommending devices 200 in addition to the TV 300.

FIG. 3B is a diagram illustrating a media resource recommending system which includes a network 220, a set-top box 310, a display device 320, and a DB server 210. The media resource recommending system illustrated in FIG. 3B may correspond to another exemplary embodiment of the media resource recommending system illustrated in FIG. 3A. Thus, although omitted herein, the above descriptions about the media resource recommending system may also be applied to the media resource recommending system of FIG. 3B.

Referring to FIG. 3B, the media resource recommending system may include a network 220, a DB server 210, a set-top box 310, and a display device 320. The media resource recommending device 200 of FIG. 2 may correspond to a combination of the set-top box 310 and/or the display device 320 of FIG. 3B. The set-top box 310 may include a communicator and a controller and may be connected to an external network to provide a multimedia communication service.

In an exemplary embodiment, the set-top box 310 may acquire information about the background media resource DB from the DB server 210 via the network 220. The set-top box 310 may recommend a media resource by using the current media resource 110 and background media resource DB information. For example, the set-top box 310 may generate the media resource recommendation list 130 and provide the generated media resource recommendation list 130 to the user by using the display device 320.

FIG. 3C is a diagram illustrating a media resource recommending system, according to another exemplary embodiment. Referring to FIG. 3C, the media resource recommending system may include a network 220, a media resource recommending device 200, and a DB server 210.

In an exemplary embodiment, the DB server 210 may receive information about the current media resource 110 from the media resource recommending device 200. The DB server 210 may generate the media resource recommendation list 130 by using the information received from the media resource recommending device 200.

The DB server 210 may transmit the generated media resource recommendation list 130 to the media resource recommending device 200. The media resource recommending device 200 may provide the user with the media resource recommendation list 130 received from the DB server 210.

In an exemplary embodiment, the media resource recommending device 200 may receive a user input that relates to the media resource recommendation list 130. For example, the user may select the media resource included in the media resource recommendation list 130. The media resource recommending device 200 may transmit information about the user's selection to the DB server 210. The DB server 210 may update the media resource recommendation list 130 based on the information about the user's selection.

Figure 4:
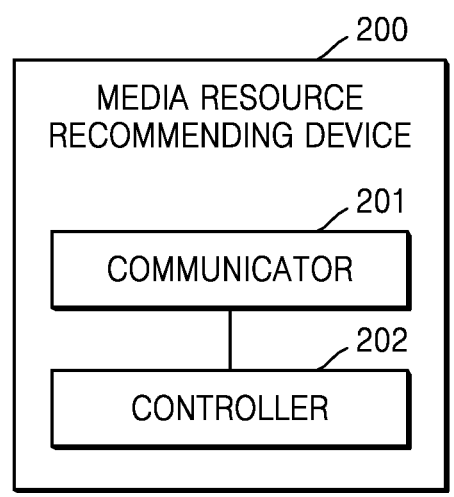
FIG. 4 is a schematic block diagram illustrating a media resource recommending device, according to an exemplary embodiment.

FIG. 4 is a schematic block diagram illustrating a media resource recommending device 200, according to an exemplary embodiment. The media resource recommending device 200 of FIG. 4 may correspond to a system which includes the TV 100 of FIG. 1, the TV 300 of FIG. 3A, or the set-top box 310 and/or the display device 320 of FIG. 3B. Referring to FIG. 4, the media resource recommending device 200 may include a communicator 201 and a controller 202.

The communicator 201 may collect background media resource DB information. For example, the communicator 201 may receive information about one or more media resources, which may be played by the TV 100, from an external server. The information about the media resources may include at least one of title information, caption information, and image information of each media resource.

The controller 202 may control the communicator 201 and may process the media resource DB information collected by the communicator 201. Further, the controller 202 may extract text information that relates to a media resource collected by the communicator 201. The controller 202 may acquire a feature word of the media resource based on the extracted text information.

The controller 202 may give a weight to each feature word. The controller 202 may acquire a clustering similarity between each media resource included in the background media resource DB and the current media resource, which is being watched or accessed by the user, based on the weight of each feature word. The controller 202 may recommend one or more media resources to the user based on the clustering similarity.

Figure 5:
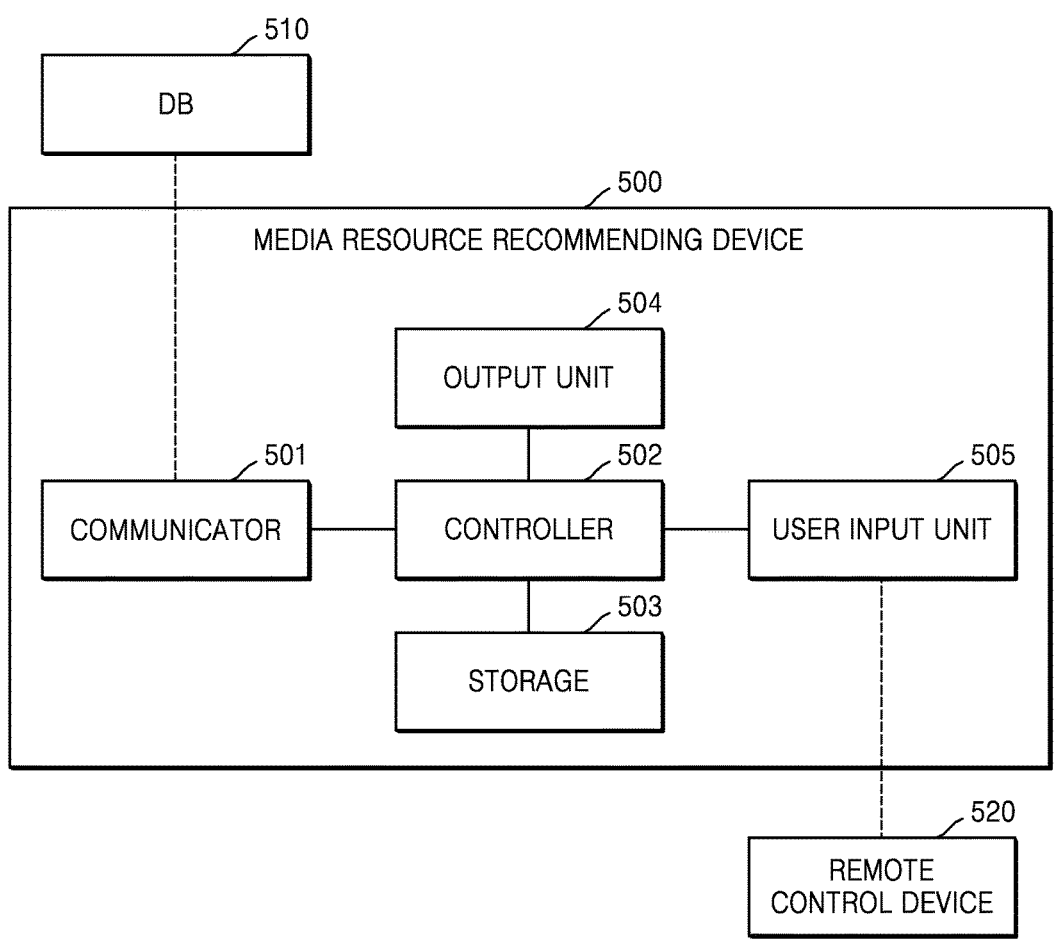
FIG. 5 is a diagram illustrating a system, according to an exemplary embodiment.

FIG. 5 is a diagram illustrating a system, according to an exemplary embodiment. Referring to FIG. 5, the system may include a media resource recommending device 500, a DB 510, and a remote control device 520.

The media resource recommending device 500 illustrated in FIG. 5 may correspond to another exemplary embodiment of the media resource recommending device 200 illustrated in FIG. 4. Thus, although omitted herein, the above descriptions about the media resource recommending device 200 may also be applied to the media resource recommending device 500 of FIG. 5.

Referring to FIG. 5, the media resource recommending device 500 may include a communicator 501, a controller 502, a storage 503, an output unit 504, and a user input unit 505. The communicator 501 may communicate with an external DB 510 and receive information about a media resource stored in the DB 510. The DB 510 may include an external server that stores one or more media resources that may be played by the TV 100. The information received by the communicator 501 may be stored in the storage unit 503.

The output unit 504 may include a display unit (not illustrated) and an audio output unit (not illustrated). The output unit 504 may output the media resource received by the communicator 501 and provide the received media resource to the user. Further, the output unit 504 may provide recommendation information about the media resource included in the DB 510 to the user.

The user input unit 505 may receive, from the user, a user input that relates to selecting a media resource. The user may communicate with the user input unit 505 wirelessly or by wire by using the remote control device 520. The remote control device 520 may include an external device, such as, for example, a smart phone or a remote controller.

The controller 502 may control an overall operation of the media resource recommending device 500 and a signal flow between the internal components 501 to 505 of the media resource recommending device 500 and perform a data processing function. When a user input is received or a preset and prestored condition is satisfied, the controller 502 may execute various applications and an operating system (OS) stored in the storage unit 503.

The controller 502 may include: a processor (not illustrated); a random-access memory (RAM) (not illustrated) used to store signals or data input from external devices or used as a storage region in correspondence with various operations performed in the media resource recommending device 500; and a read-only memory (ROM) (not illustrated) used to store a control program for controlling the media resource recommending device 500.

The processor may include a graphics processing unit (GPU) (not illustrated) for graphics processing that corresponds to videos. The processor may be implemented as a system-on-chip (SoC) which includes a combination of a GPU (not illustrated) and a core (not illustrated). The processor may include a single core, a dual core, a triple core, a quad core, and/or a multiple core thereof.

The controller 502 may control the communicator 501, the storage unit 503, the output unit 504, and the user input unit 505. The controller 502 may store the information received by the communicator 501 in the storage unit 503 and analyze the information stored in the storage unit 503, in order to generate the media resource recommendation list 130. The controller 502 may control the output unit 504 to provide the media resource and the generated media resource recommendation list 130 to the user. The controller 502 may control the user input unit 505 to receive a user input for selecting a media resource. The controller 502 may use the output unit 504 to provide the user with the media resource selected by the user.

Figure 6:
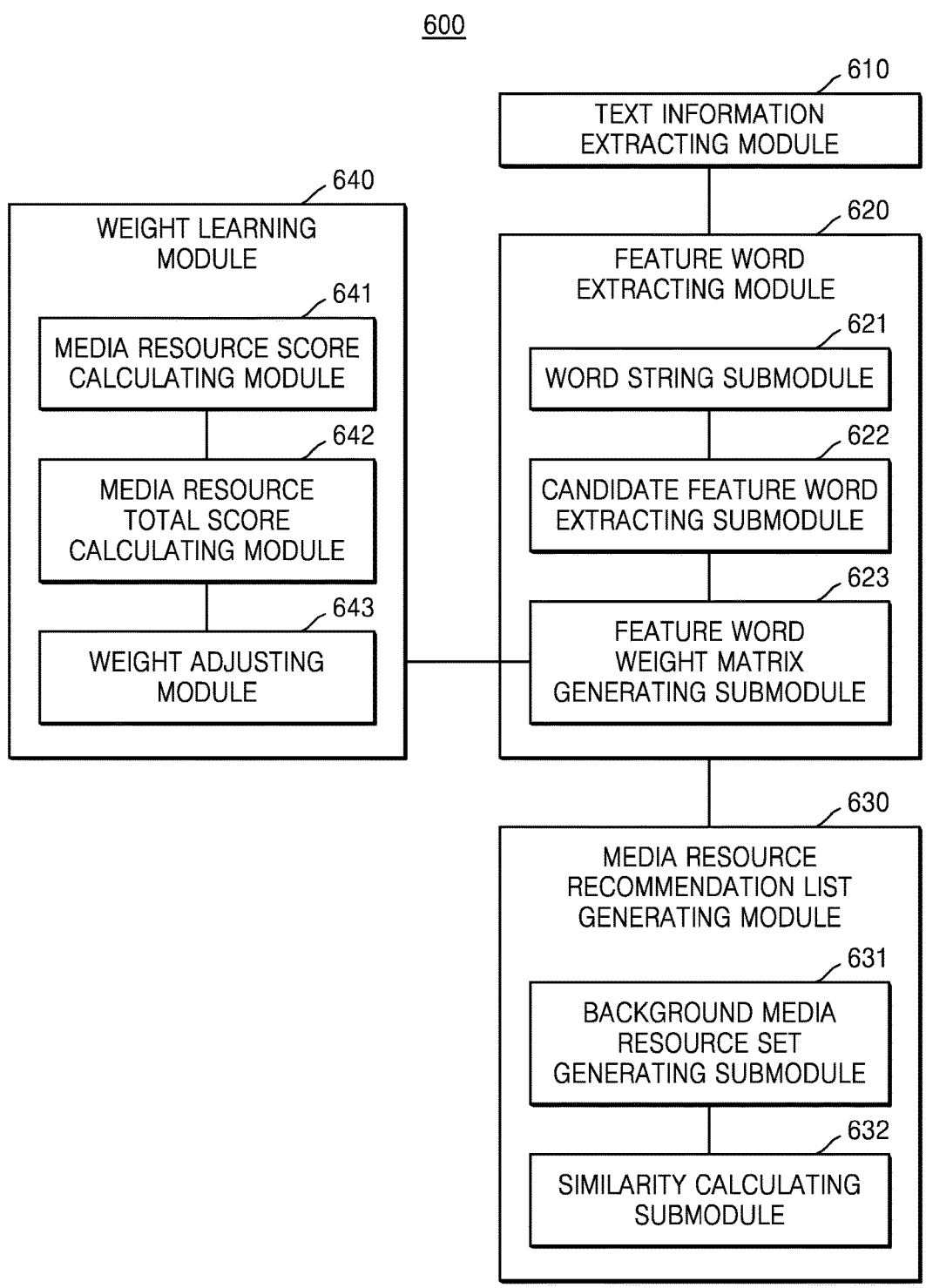
FIG. 6 is a block diagram illustrating a module system of a media resource recommending device, according to an exemplary embodiment.

FIG. 6 is a block diagram illustrating a module system 600 of a media resource recommending device, according to an exemplary embodiment. The module system 600 illustrated in FIG. 6 may correspond to a block diagram of the modules stored in the storage unit 503 of FIG. 5. The controller 502 may perform the respective functions of the media resource recommending device 500 by using the modules stored in the storage unit 503.

As illustrated in FIG. 6, the module system 600 may include a text information extracting module 610, a feature word extracting module 620, a media resource recommendation list generating module 630, and a weight learning module 640. Each of the modules 610, 620 630, and 640 may be implemented as a hardware component (e.g., a processor or dedicated circuitry), a software program, or as a combination of hardware and software.

The text information extracting module 610 may be configured to extract text information of a media resource. The text information of the media resource may include the title of the media resource and the caption of the media resource.

The feature word extracting module 620 may be configured to extract candidate feature words of each media resource according to the extracted text information of each media resource. The feature word extracting module 620 may acquire a feature word by calculating a weight of each candidate feature word and filtering the candidate feature word according to the calculated weight. The feature word extracting module 620 may generate a feature word weight matrix T of a background media resource DB.

For example, the feature word extracting module 620 may include a word string submodule 621, a candidate feature word extracting submodule 622, and a feature word weight matrix generating submodule 623.

The word string submodule 621 may divide the text information of each media resource of the background media resource DB into a plurality of word strings based on a lexical analysis tool and parts of speech. Herein, the lexical analysis tool may refer to a method and system for dividing the text information based on syllables, words, and punctuation marks.

The candidate feature word extracting submodule 622 may match a word string of each media resource with a hot-word dictionary, and may combine a plurality of words based on the longest word string among the matched word strings. Herein, the term "hot word" may refer to a word that appears at a predetermined frequency or more in the text information of the background media resource DB. The candidate feature word extracting submodule 622 may take the combined words as the candidate feature word of each media resource.

The feature word weight matrix generating submodule 623 may calculate a weight of the candidate feature words based on a term frequency—inverse document frequency (TF-IDF) value and may filter the candidate feature words which have a weight that is not smaller than a threshold value based on a stop list. The feature word weight matrix generating submodule 623 may designate the filtered candidate feature words as the feature word of each media resource.

The feature word weight matrix generating submodule 623 may perform singular value decomposition (SVD) on the feature word weight matrix T. By performing SVD, the feature word weight matrix generating submodule 623 may acquire three matrixes S, V, and $U^T$ which constitute a semantic relationship. The three matrixes may have a relationship therebetween which may be expressed according to Equation 1 below.

$$T = SVU^T \qquad \text{Equation 1}$$

Herein, $U^T$ may be a feature word matrix that may be acquired by reducing the dimension of the feature word weight matrix T by SVD. Herein, the semantic relationship may refer to a logically-inferable relationship between words, other than a dictionary-defined relationship therebetween.

The media resource recommendation list generating module 630 may calculate a clustering similarity between each media resource included in the background media resource DB and a current media resource that is being watched or accessed by the user. The media resource recommendation list generating module 630 may calculate the clustering similarity by using a clustering method and the feature word weight matrix T. The media resource recommendation list generating module 630 may select L media resources which have the highest clustering similarity and generate the media resource recommendation list 130 based on the selected set of media resources.

The media resource recommendation list generating module 630 may include a background media resource set generating submodule 631 and a similarity calculating submodule 632. The background media resource set generating submodule 631 may define the feature words of the current media resource as particular feature words and generate a background media resource set $\varphi(D)$ for the media resources. The weights of all particular feature words in the media resource DB may be greater than zero.

The similarity calculating submodule 632 may cluster the background media resource set $\varphi(D)$ by using a K-mean algorithm. K in the K-mean algorithm may refer to the number of particular feature words. The background media resource set $\varphi(D)$ may be divided into K types, including $\varphi_{K\text{-}means}(D)_1, \varphi_{K\text{-}means}(D)_2, \ldots, \varphi_{K\text{-}means}(D)_i, \ldots, \varphi_{K\text{-}means}(D)_K$.

The weight learning module 640 may adjust the weight of the feature word weight matrix T of the background media resource DB based on an order and a frequency of clicking the media resource in the media resource recommendation list 130 by the user.

The weight learning module 640 may include a media resource score calculating module 641, a media resource total score calculating module 642, and a weight adjusting module 643. The media resource score calculating module 641 may calculate a score $\text{Score}(R_i)$ given to a media resource $R_i$ by the user, based on Equation 2 below.

$$\text{Score}(R_l) = \frac{(L + 1 - \text{rank}(R_l))}{L} \times \text{Score\_max} \qquad \text{Equation 2}$$

Herein, $R_i$ may be the media resource that is currently clicked in the media resource recommendation list 130 and watched or accessed by the user. IN addition, $\text{rank}(R_i)$ ($1 \leq \text{rank}(R_i) \leq L$) may be the order of clicking the media resource $R_i$ by the user. Score_max may be a constant for restricting the maximum value that may be given to the media resource by a single user.

The media resource total score calculating module 642 may calculate a total score $$\sum_P \text{Score}(R_l)$$

of the media resource $R_i$. Herein, P may be the number of users that have currently clicked the media resource $R_i$.

When the total score of the current media resource $R_i$ is not greater than a score threshold value $$P \times \frac{\text{Score\_max}}{2},$$

the weight adjusting module 643 may adjust the weight of each feature word of the media resource $R_i$ according to Equation 3 below.

$$f(t_j) = t_j \times (1 + \text{Score}(R_i)/(\alpha+1)) \qquad \text{Equation 3}$$

In Equation 3, $t_j$ may be a weight of the jth feature word of the media resource $R_i$. For example, $t_j$ may be an element of the feature word weight matrix T corresponding to the media resource $R_i$. $f(t_j)$ may be an adjusted weight of the jth feature word of the media resource $R_i$.

$$\left( \alpha \in \left[ \frac{\text{Score\_max}}{L}, \text{Score\_max} \right] \right)$$

may be a weight adjustment parameter.

Figure 7:
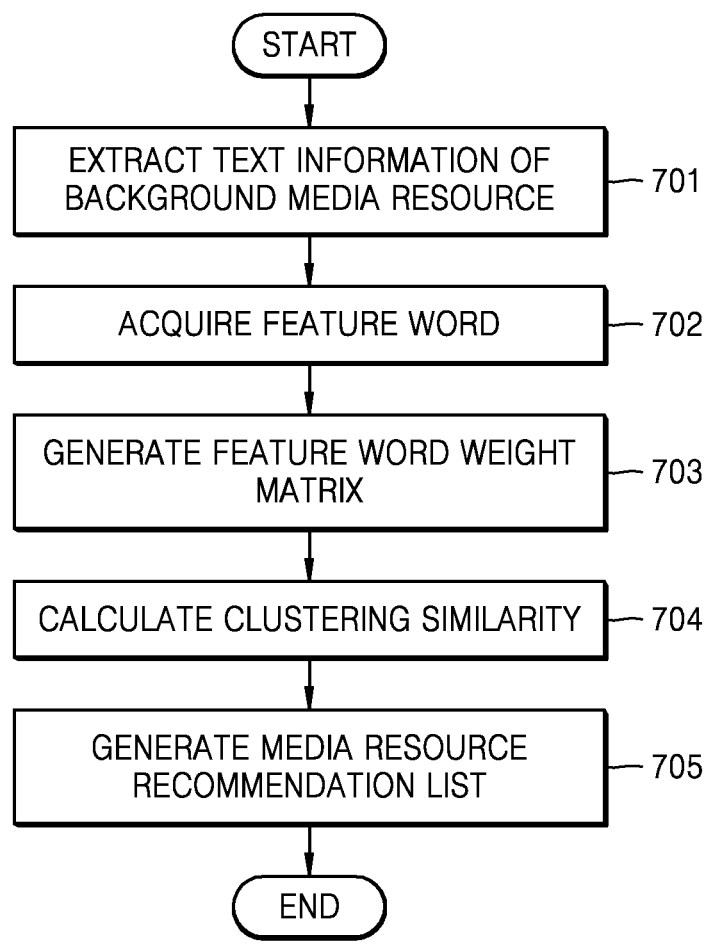
FIG. 7 is a schematic flowchart illustrating a media resource recommending method, according to an exemplary embodiment.

FIG. 7 is a schematic flowchart illustrating a media resource recommending method, according to an exemplary embodiment. Referring to FIG. 7, in operation 701, the media resource recommending device 200 may extract text information of the background media resource. The text information of the media resource may include the title of the media resource and the caption of the media resource.

In operation 702, the media resource recommending device 200 may acquire a feature word of the background media resource DB based on the extracted text information of the media resource acquired in operation 701. The feature word of the media resource may be a word that may define, represent, and/or indicate the content of the media resource.

In operation 703, the media resource recommending device 200 may define a weight of each feature word acquired in operation 702. Further, the media resource recommending device 200 may generate a feature word weight matrix that represents the weight of each feature word and the media resource in the form of a matrix. For example, a row of the matrix may represent each feature word, and a column of the matrix may represent each media resource. A value of the matrix may represent a weight of each feature word for each media resource.

In operation 704, the media resource recommending device 200 may calculate a clustering similarity between each media resource included in the background media resource DB and a current media resource, which is being watched or accessed by the user, based on the feature word weight matrix acquired in operation 703. A method of acquiring the clustering similarity will be described below.

In operation 705, the media resource recommending device 200 may generate a media resource recommendation list 130 which includes one or more media resources, based on the clustering similarity calculated in operation 704. In an exemplary embodiment, the media resource recommendation list 130 may be arranged in descending order of the clustering similarity calculated in operation 704.

FIG. 8 is a flowchart illustrating a media resource recommending method, according to an exemplary embodiment.

Referring to FIG. 8, in operation 801, the media resource recommending device 200 may extract text information about all media resources of the background media resource DB.

In this operation, the media resource recommending device 200 may preferentially extract the text information about all media resources of the background media resource DB. Each media resource in the background media resource DB may be represented as $D_i$. i may be a positive integer, and $1 \leq i \leq N$ may be set when N is the number of media resources included in the background media resource DB.

In one exemplary embodiment, all media resources of the background media resource DB may be classified into two types: news texts and video resources. The text information of the news may be extracted directly. The text information of the video resource may include the caption content and the title of the video, and the video title may be acquired relatively easily.

The caption content may be recognized in two ways. The first way may be to extract the caption from the current stream that is being played. The second way may be to extract the caption therefrom by processing an image, disposing the caption in the image, and integrating the extracted caption into the corresponding video description text.

Since the media resource recommending device 200 extracts the text information about all media resources of the background media resource DB, each media resource may be represented as text.

In operation 802, the media resource recommending device 200 may extract respective candidate feature words of each media resource included in the background media resource DB.

The media resource recommending device 200 may extract the candidate feature words of each media resource by using the text information acquired in operation 801. The candidate feature words of each media resource may typically represent the content of the media resource.

First, in order to acquire a word string of each media resource, the media resource recommending device 200 may divide the text information of each media resource into several portions based on the respective parts of speech by using a lexical analysis tool. The lexical analysis tool may divide the text information only according to the parts of speech. Thus, each word acquired by the division may not consider the context of the text information.

Thus, some words that need not be considered, that is, "zai" (e.g., words such as prepositions, auxiliary verbs, or adverbs) and "ba" (e.g., words such as prepositions or auxiliary verbs) may be acquired in the division process. One word string may be divided into two or more words. For example, "Sohu video" may be divided into three words "So", "hu", and "video". However, "Sohu video" may have to be used as one word string in order to represent the media resource.

Since the lexical analysis tool has the above demerit, the above-acquired words may not be directly used as the candidate feature words of each media resource. Thus, the words acquired by the lexical analysis tool may have to be matched with the hot-word dictionary. For example, a plurality of words having a predetermined relationship in the hot-word dictionary may be combined with each other. The combined words may be considered as the candidate feature words of the media resource.

For example, the word string of the media resource may include three words "So", "hu", and "video", and the hot-word dictionary may include four words, for example, "So", "hu", "video", and "Sohu video". The three words "So", "hu", and "video" of the media resource may be combined into the longest word string "Sohu video".

In an exemplary embodiment, the media resource recommending device 200 may match the word strings of each media resource with the hot-word dictionary by using a dictionary tree method. The words which are modified via the use of the hot-word dictionary may be more consistent with the reading habits of persons.

The hot-word dictionary may include a set of hot words. The hot words of the hot-word dictionary may characteristically represent the semantic information of the background media resource DB. The hot words may be generated by the following method.

(1) The text information of all media resources of the background media resource DB may be divided by the separators of a particular language according to the language types of the text information of all media resources of the background media resource DB. For example, the text information may be divided into sub-sentences by Chinese punctuation marks "○", "", "!", and "?" or English punctuation marks ",", "?", and ".".

(2) The term frequency (TF) of a repeated word string in the background media resource DB may be calculated. The TF of the repeated word string may be defined by the number of sentences which include the repeated word string in the background media resource DB. In the repeated word string, a word string that has a TF greater than a TF threshold value may exist. In this case, the word string having a TF greater than a TF threshold value may be considered as a candidate word string for generating a candidate word string set.

(3) The candidate word string may be filtered, and the filtered candidate word string may be considered as hot words for generating the hot-word dictionary.

The media resource recommending device 200 may implement a particular filter method by performing the following three steps:

a. The media resource recommending device 200 may collect a stop list that includes a set of words that fail to represent the feature of the media resource. For example, the stop list may include articles, auxiliary words, and/or phrases that are formally included in the media resource. The media resource recommending device 200 may filter the candidate word strings by using the stop list. In particular, the media resource recommending device 200 may delete the candidate word strings included in the stop list from the candidate word string set.

b. The media resource recommending device 200 may calculate a weight of each candidate word string. The weight may be represented by a TF-IDF value. The media resource recommending device 200 may delete a candidate word string that has a weight smaller than a weight threshold value from the candidate word string set. A method of calculating the TF-IDF value is the same as the conventional method, and detailed descriptions thereof will be omitted herein.

c. The media resource recommending device 200 may acquire the tendency of noise data that appears frequently in the candidate word string. For example, a noise word string which includes time information, numerals, and units may appear mainly in the text information, and the media resource recommending device 200 may delete such a noise word string from the candidate word string set.

In operation 803, the media resource recommending device 200 may additionally extract the feature words of each media resource of the background media resource DB.

In this operation, by extracting the feature words of each media resource of the background media resource DB, the media resource recommending device 200 may represent each media resource by at least one feature word. A method of extracting the feature word of the media resource may be implemented as described below.

The weight acquired in operation 802 may be represented by the TF-IDF value of the candidate feature word. The media resource recommending device 200 may delete the candidate feature word which has a weight that is smaller than a weight threshold value. The candidate feature word which has a weight that is not smaller than the weight threshold value may be filtered by using the stop list. The filtered candidate feature words of the media resource may be considered as the feature word of the media resource.

The feature words of all media resources of the background media resource DB may be defined by the feature words of the background media resource DB. The feature words of the background media resource DB may be represented in the form of a vector $C=[c_1, \ldots, c_j, \ldots, c_M]$. $c_j$ may be the jth feature word of the background media resource DB, and M may be the number of feature words of the background media resource DB. The feature words of the background media resource DB may include the feature word of each media resource, and all feature words of the background media resource DB may be different from each other.

In an exemplary embodiment, an M×N feature word weight matrix T may be set. M may denote the number of feature words $c_j$ of the background media resource DB. N may denote the number of media resources $D_i$ of the background media resource DB. An element $t_{ji}$ of the feature word weight matrix T may represent a weight of the feature word $c_j$ of the media resource $D_i$. $t_{ji}$ may be a TF-IDF value of the feature word $c_j$ of the media resource $D_i$, and $t_{ji}$ may be set to zero when the feature word $c_j$ is not a feature word of the media resource $D_i$.

In operation 804, the media resource recommending device 200 may perform singular value decomposition (SVD) on the feature word weight matrix T.

In order to derive a semantic relationship between the feature words of the background media resource DB, the media resource recommending device 200 may perform SVD on the feature word weight matrix T. Three matrixes S, V, and $U^T$ may be acquired as a result of the SVD. The three matrixes may have a relationship therebetween which may be expressed according to Equation 4 below.

$$T=SVU^T \qquad \text{Equation 4}$$

$U^T$ may be a feature word matrix that is acquired by reducing the dimension of the feature word weight matrix T via SVD. The SVD may implement subject extraction, and the weights of words in the same subject may be equal within a given range. Thus, by performing the SVD, the media resource recommending device 200 may detect the semantic relationship between a feature word and another feature word in the feature word weight matrix T.

In operation 805, the media resource recommending device 200 may determine whether the current media resource is the media resource included in the background media resource DB. When the current media resource is not the media resource of the background media resource DB, operation 806 is performed. Conversely, when the current media resource is the media resource of the background media resource DB, operation 807 is performed.

In operation 806, the media resource recommending device 200 may calculate a weight vector of the current media resource 110. The media resource recommending device 200 may first acquire text information of the current media resource 110 that is being watched or accessed by the user. A method of acquiring the text information of the current media resource is the same as the method of acquiring the text information of each media resource of the background media resource DB in operation 801, and redundant descriptions thereof will be omitted herein.

The media resource recommending device 200 may extract the candidate feature words of the current media resource 110 based on the acquired text information of the current media resource 110 (an extraction method thereof may be the same as the method of extracting the candidate feature words of the background media resource DB in operation 802).

The media resource recommending device 200 may match the candidate feature words of the current media resource 110 with a feature word vector C. When a candidate feature word of the current media resource 110 is not an element of the feature word vector C, the media resource recommending device 200 may delete the candidate feature word of the current media resource 110.

The media resource recommending device 200 may calculate a respective weight of each of the candidate feature words that are not deleted. Herein, the weight may also be represented by a TF-IDF value. The media resource recommending device 200 may delete the candidate feature words which have a respective weight that is smaller than a weight threshold value, and may filter the candidate feature words which have a weight that is not smaller than the weight threshold value by using the stop list. The remaining candidate feature words may be considered as the feature words of the current media resource 110.

In an exemplary embodiment, a weight vector Y of the current media resource 110 may be generated. Y may be an M×1 matrix, and an element $y_j$ (1≤j≤M) of the matrix may be a weight of the feature word $c_j$ of the current media resource 110. When the feature word $c_j$ is the feature word of the current media resource 110, $y_j$ may be a TF-IDF value of the feature word $c_j$ of the current media resource 110. When the feature word $c_j$ is not the feature word of the current media resource 110, $y_j$ may be set to zero.

Thereafter, a transformation may be performed on a matrix Y in accordance with Equation 5 below.

$$Y1 = Y^T S V^{-1} \qquad \text{Equation 5}$$

Herein, $Y^T$ is a transposed matrix of Y and $V^{-1}$ is an inverse matrix of V.

In operation 807, the media resource recommending device 200 may generate a media resource recommendation list 130 by using a clustering method. In order to generate the media resource recommendation list 130 for capturing the user's interest more accurately, the media resource recommending device 200 may generate the media resource recommendation list 130 by performing the clustering method.

In operation 807, the media resource recommending device 200 may define the feature words of the current media resource 110 as particular feature words. The media resources of the background media resource DB, the weight of all feature words of which is greater than zero, may constitute a background media resource set φ(D).

The background media resource set φ(D) may be clustered by using a K-mean algorithm. K in the K-mean algorithm may refer to the number of particular feature words, and the background media resource set φ(D) may be divided into K types. For example, the K types may include $\varphi_{K\text{-}means}(D)_1, \varphi_{K\text{-}means}(D)_2, \ldots, \varphi_{K\text{-}means}(D)_i, \ldots, \varphi_{K\text{-}means}(D)_K$.

A clustering similarity between a current media resource 110 D' and a background media resource $D_j$ of $\varphi_{K\text{-}means}(D)_i$ may be calculated by applying Equation 6 below.

$$Sim_{K\text{-}means}(D_j, D')_i = \frac{Sim(D_j, D')}{\sum_{\forall D_k \in \varphi_{K\text{-}means}(D)_i} Sim(D_k, D')} \qquad \text{Equation 6}$$

By Equation 6, the clustering similarity between the current media resource 110 and each background media resource of $\varphi_{K\text{-}means}(D)_i$ may be acquired.

A similarity $Sim(D_j, D')$ between the current media resource 110 D' and the background media resource $D_j$ may be calculated by using a cosine similarity as expressed in Equation 7 below.

$$Sim(D_j, D') = \frac{\sum_{k=1}(u_{jk} \times y_k)}{\sqrt{\sum_{k=1} u_{jk}^2} \sqrt{\sum_{k=1} y_k^2}} \qquad \text{Equation 7}$$

When the current media resource 110 D' is not the resource of the background media resource DB, $u_{jk}$ may be a jth-row and kth-column element of $U^T$ which corresponds to $D_j$ and $y_k$ may be a kth-column element of Y1 corresponding to D'. When the current media resource 110 D' is the resource of the background media resource DB, that is, when $D'=D_d$, d≠j, and 1≤d≤N, $u_{jk}$ may be a jth-row and kth-column element of $U^T$ which corresponds to $D_j$ and $y_k$ may be a dth-row and kth-column element of $U^T$ which corresponds to D'.

Each background media resource of φ(D) may be arranged according to the clustering similarity. The first L background media resources may be selected to generate the media resource recommendation list 130 to be returned to the user. The first L background media resources may be L background media resources that have the highest relevance to the current media resource 110. L may be an integer which is greater than zero.

In operation 808, the media resource recommending device 200 may update the background media resource DB. In an exemplary embodiment, the current media resource may be the media resource included in the background media resource DB. In this case, the background media resource DB need not be modified, and the feature word weight matrix T of the background media resource DB need not be changed.

In another exemplary embodiment, the current media resource may not be the media resource included in the background media resource DB. In this case, the current media resource 110 D' may be added as $D_{N+1}$ to the background media resource DB. The updated background media resource DB may include (N+1) media resources, and the feature word weight matrix T may be updated accordingly.

T may be updated as an M×(N+1)-dimensional matrix. For example, one column may be added to the original feature word weight matrix T, and the added elements may be Y in operation 805. Thereafter, a media resource recommendation list 130 for another current media resource may be re-generated by the user. In this case, the background media resource DB may include (N+1) media resources. Also, operations 801, 802, and 803 need not be re-performed, and operation 804 may be directly performed.

A resource recommendation having various types for the current media resource that is being watched on the TV by the user may be implemented by the above method. The recommendation list acquired by the above method may satisfy the user's requirement based on diversity information.

In addition, the media resource recommending device 200 may utilize the user's feedback information, such as, for example, the click order and the click frequency of different users on the media resource of the media resource recommendation list 130. For example, the media resource recommending device 200 may adjust a weight of the feature word clicked in the media resource recommendation list 130. In this case, when the media resource recommendation list 130 is re-calculated next for the user, the media resource recommendation may be better matched with the user's interest.

FIG. 9 is a flowchart illustrating a feedback-based media resource recommending method, according to an exemplary embodiment. The present exemplary embodiment may be defined by considering a feature word weight of the media resource $R_i$ of the media resource recommendation list 130. For example, l is a positive integer, and $1 \leq l \leq L$. As illustrated in FIG. 9, the media resource recommending device 200 may perform the following operations whenever the user clicks the media resource of the media resource recommendation list 130.

Referring to FIG. 9, in operation 901, the media resource recommending device 200 may calculate a score that is given to the media resource by the user. The user may select one or more media resources from the media resource recommendation list 130 according to the user's interest. When the user clicks the media resource of the media resource recommendation list 130, the click order of the clicked media resource may be generated.

For example, the order of clicking the media resource $R_i$ by the user may be represented as rank($R_i$) Since $R_i$ is the media resource of the media resource recommendation list 130 which includes L media resources, the click order may satisfy $1 \leq \text{rank}(R_i) \leq L$. The score of $R_i$ given by a single user may be calculated according to a click order formula which may be expressed according to Equation 8 below.

$$\text{Score}(R_l) = \frac{(L + 1 - \text{rank}(R_l))}{L} \times \text{Score\_max} \qquad \text{Equation 8}$$

Herein, Score_max may be a constant for restricting the maximum value that may be given to the media resource by a single user.

In operation 902, the media resource recommending device 200 may calculate a total score of the current media resource 110. The total score of the current media resource 110 $R_i$ may be defined as the sum of scores given to $R_i$ by all users. When P users currently click the media resource $R_i$, each user may give a score to the media resource $R_i$ and $$\sum_P \text{Score}(R_l)$$

may be the total score of the current media resource $R_i$.

In operation 903, the media resource recommending device 200 may compare the total score of the current media resource with a predetermined score threshold value. When the total score of the current media resource is not greater than the score threshold value, operation 904 may be performed. Conversely, when the total score of the current media resource is greater than the score threshold value, operation 905 may be performed.

In this operation, P is the number of users that have clicked the media resource $R_i$. When the total score of the current media resource $R_i$ is not greater than a score threshold value $$P \times \frac{\text{Score\_max}}{2},$$

the number of users that have clicked the media resource $R_i$ may be relatively small and/or the order of the user that has clicked the media resource $R_i$ may be relatively low. Based on this information, the media resource recommending device 200 may determine that the number of users preferring the media resource $R_i$ is small. Thus, the media resource recommending device 200 may not greatly adjust the feature word weight of $R_i$.

When the total score of the current media resource $R_i$ is greater than the score threshold value $$P \times \frac{\text{Score\_max}}{2},$$

the number of users that have clicked the media resource $R_i$ may be relatively large and/or the order of the user that has clicked the media resource $R_i$ may be relatively high. Based on this information, the media resource recommending device 200 may determine that the number of users preferring the media resource $R_i$ is large. Thus, the media resource recommending device 200 may greatly adjust the feature word weight of $R_i$.

In operation 904, the media resource recommending device 200 may finely adjust the weight of each feature word of the media resource. In this operation, $t_j$ may be the weight of the jth feature word of the media resource $R_i$. For example, it is an element of the feature word weight matrix T that corresponds to the media resource $R_i$. $\alpha$ is a weight adjustment parameter and an empirical constant $$\alpha \left( \alpha \in \left[ \frac{\text{Score\_max}}{L}, \text{Score\_max} \right] \right).$$

After the weight of each feature word of the media resource $R_i$ is calculated according to the formula, the feature word weight matrix T of the background media resource DB may be updated.

In operation 905, the media resource recommending device 200 may add all feature words of the media resource to the high-frequency feature word set and adjust the weight of each feature word of the media resource accordingly. In this operation, the total score of the current media resource $R_i$ may be greater than the score threshold value $$P \times \frac{\text{Score\_max}}{2}.$$

In this case, the media resource $R_i$ may be more attractive to the user, and all feature words of the media resource $R_i$ may be added to a high-frequency feature word set φ(t).

The feature words of φ(t) may be of various types. In particular, φ(t) may not include the same feature words. Further, the weight of each feature word of the media resource $R_i$ may be adjusted according to Equation 9 below.

$$f(t_j) = t_j \times (1 + Score(R_i)/(\beta+1))  \quad \text{Equation 9}$$

In Equation 9, $t_j$ may be a weight of the jth feature word of the media resource $R_i$. For example, $t_j$ may be an element of the feature word weight matrix T which corresponds to the media resource $R_i$. $f(t_j)$ may be an adjusted weight of the jth feature word of the media resource $R_i$. β may be a weight adjustment parameter and an empirical constant $$\left(\beta \in \left[\frac{Score\_max}{X}, Score\_max\right]\right),$$

and X may be the number of feature words of φ(t). After the weight of each feature word of the media resource $R_i$ is calculated according to the formula, the feature word weight matrix T of the background media resource DB may be updated.

A method for adjusting the feature word weight matrix T for various users according to the click frequency and order has been described above. Based on this method, the feature word weight of the background media resource may be adjusted according to the click feedback information of the user. Thus, the more significant hot-media resource order may be provided to the user, and the recommendation performance may be improved. An exemplary embodiment may further provide a resource recommending device based on a semantic link in a TV.

The devices according to the exemplary embodiments may include a processor, a memory configured for storing and executing program data, a permanent storage such as a disk drive, a communication port configured for communicating with an external device, and user interface (UI) devices, such as a touch panel, keys, and buttons. The methods implemented by software modules or algorithms may be stored on a non-transitory computer-readable recording medium as computer-readable codes or program commands that are executable by the processor.

Examples of the non-transitory computer-readable recording medium include magnetic storage media (e.g., read-only memories (ROMs), random-access memories (RAMs), floppy disks, and hard disks) and optical recording media (e.g., compact disk read-only memories (CD-ROMs) and digital versatile disks (DVDs)). The non-transitory computer-readable recording medium may also be distributed over network-coupled computer systems so that the computer-readable codes may be stored and executed in a distributed fashion. The non-transitory computer-readable recording medium is readable by a computer, and may be stored in a memory and executed in a processor.

The exemplary embodiments may be described in terms of functional block components and various processing operations. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices.

Similarly, where the elements of the present inventive concept are implemented by software programming or software elements, the exemplary embodiments may be implemented by any programming or scripting language such as C, C++, Java, or assembly language, with various algorithms being implemented by any combination of data structures, processes, routines, or other programming elements.

Functional aspects may be implemented by an algorithm that is executed in one or more processors. In addition, the exemplary embodiments may employ the related art for electronic environment setting, signal processing, and/or data processing. Terms such as "mechanism," "element," "unit," and "configuration" may be used in a broad sense, and are not limited to mechanical and physical configurations. The terms may include the meaning of software routines in conjunction with processors or the like.

Particular implementations described herein are merely exemplary, and do not limit the scope of the present inventive concept in any way. For the sake of conciseness, descriptions of related art electronic configurations, control systems, software, and other functional aspects of the systems may be omitted. Further, the connection lines or connection members between various elements illustrated in the drawings represent exemplary functional connections and/or physical or logical connections between the various elements, and various alternative or additional functional connections, physical connections, or logical connections may be present in a practical apparatus.

The use of the terms "a," "an," and "the" and similar referents in the context of the specification (especially in the context of the following claims) may be construed to cover both the singular and the plural. In addition, a recitation of a range of values herein is merely intended to serve as a shorthand method of referring individually to each separate value falling within the range, unless otherwise indicated herein, and each separate value is incorporated into the specification as if it were individually recited herein. Further, the operations of the method described herein may be performed in any suitable order unless otherwise indicated herein or otherwise clearly contradicted by the context.

The scope of the present inventive concept is not limited to the above-described operation order. All examples or exemplary terms (e.g., "such as") provided herein are merely used to describe the exemplary embodiments of the present inventive concept in detail, and the scope of the present inventive concept is not limited by the examples or exemplary terms unless otherwise claimed. Further, those of ordinary skill in the art will readily understand that various modifications and combinations may be made according to design conditions and factors without departing from the spirit and scope of the present inventive concept as defined by the following claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display device for providing a media resource, the display device comprising:
   a processor configured:
   to extract text information from each of a plurality of media resources included in a background media resource DB, to acquire at least one respective feature word of each corresponding one of the plurality of media resources based on the extracted text information, to generate a feature word weight matrix which includes a respective first weight of each of the at least one respective feature word, to determine whether a current media resource is not included in the background media resource DB, to calculate a clustering similarity between each of the plurality of media resources included in the background media resource DB and the current media resource, which is being accessed by a user, by using the feature word weight matrix, and to display a media resource recommendation list which includes at least one media resource based on the calculated clustering similarity, wherein the processor is further configured, when a determination is made that the current media resource is not included in the background media resource DB, to acquire at least one feature word of the current media resource based on text information extracted from the current media resource and to include a respective first weight of each of the acquired at least one feature word of the current media resource in the feature word weight matrix of the current media resource which includes the respective first weight of each of the acquired at least one feature word of the current media resource.

2. The display device of claim 1, wherein the processor is further configured to extract candidate feature words from each of the plurality of media resources included in the background media resource DB, to calculate a respective second weight of each of the extracted candidate feature words, and to filter the candidate feature words based on the calculated respective second weight of each of the candidate feature words.

3. The display device of claim 2, wherein the processor is further configured to divide the extracted text information on a keyword basis, to calculate a term frequency (TF) of each keyword in the background media resource DB, and to extract a keyword having a TF which exceeds a predetermined threshold value as a candidate feature word.

4. The display device of claim 2, wherein for each of the extracted candidate feature words, the respective second weight is calculated as a product of an inverse document frequency (IDF) and a term frequency (TF) of the corresponding candidate feature word.

5. The display device of claim 2, wherein the processor is further configured to delete, from among the extracted candidate feature words, at least one candidate feature word that corresponds to a keyword included in a preset stop list, and to delete, from among the extracted candidate feature words, at least one candidate feature word that has a respective second weight that is smaller than a preset threshold value.

6. The display device of claim 1, wherein
each row of the feature word weight matrix corresponds to a respective one of the acquired at least one feature word,
each column of the feature word weight matrix corresponds to a respective one of the plurality of media resources of the background media resource DB,
each element of the feature word weight matrix represents the respective first weight of the corresponding feature word, and the element is set to zero when the corresponding feature word is not a feature word of the corresponding media resource.

7. The display device of claim 1, wherein the processor is further configured to generate a background media resource set which includes at least one feature word from among the acquired at least one respective feature word, to cluster the generated background media resource set, and to calculate the clustering similarity between each media resource included in the background media resource DB and the current media resource by using a result of the clustering the background media resource set.

8. The display device of claim 1, wherein the processor is further configured to adjust at least one first weight of the feature word weight matrix based on a user input that relates to the provided media resource recommendation list.

9. A method for providing a media resource, the method comprising:

extracting, by a processor, text information from each of a plurality of media resources included in a background media resource database (DB);

acquiring, by the processor, at least one respective feature word of each corresponding one of the plurality of media resources based on the extracted text information;

generating, by the processor, a feature word weight matrix which includes a respective first weight of each of the at least one respective feature word;

calculating, by the processor, a clustering similarity between each of the plurality of media resources included in the background media resource DB and a current media resource, which is being accessed by a user, by using the feature word weight matrix; and displaying, by the processor, a media resource recommendation list which includes at least one media resource based on the calculated clustering similarity, wherein the calculating of the clustering similarity comprises determining, by the processor, whether the current media resource is included in the background media resource DB, and wherein when a determination is made that the current media resource is not included in the background media resource DB, the method further comprises:

extracting, by the processor, text information of the current media resource;

acquiring, by the processor, at least one feature word of the current media resource based on the text information extracted from the current media resource; and including, by the processor, a respective first weight of each of the acquired at least one feature word of the current media resource in the feature word weight matrix.

10. The method of claim 9, wherein the acquiring of the at least one respective feature word comprises:

extracting, by the processor, candidate feature words from each of the plurality of media resources included in the background media resource DB;

calculating, by the processor, a respective second weight of each of the extracted candidate feature words; and filtering, by the processor, the candidate feature words based on the calculated respective second weight of each of the candidate feature words.

11. The method of claim 10, wherein the extracting of the candidate feature words comprises:

dividing, by the processor, the extracted text information on a keyword basis;

calculating, by the processor, a term frequency (TF) of each keyword in the background media resource DB; and extracting, by the processor, a keyword having a TF which exceeds a predetermined threshold value as a candidate feature word.

12. The method of claim 10, wherein for each of the extracted candidate feature words, the respective second weight is calculated as a product of an inverse document frequency (IDF) and a term frequency (TF) of the corresponding candidate feature word.

13. The method of claim 10, wherein the filtering the candidate feature words comprises:

deleting, by the processor, from among the extracted candidate feature words, at least one candidate feature word that corresponds to a keyword included in a preset stop list; and deleting, by the processor, from among the extracted candidate feature words, at least one candidate feature word that has a respective second weight that is smaller than a preset threshold value.

14. The method of claim 9, wherein each row of the feature word weight matrix corresponds to a respective one of the acquired at least one feature word, each column of the feature word weight matrix corresponds to a respective one of the plurality of media resources of the background media resource DB, each element of the feature word weight matrix represents the respective first weight of the corresponding feature word, and the element is set to zero when the corresponding feature word is not a feature word of the corresponding media resource.

15. The method of claim 9, wherein the calculating of the clustering similarity comprises:

generating, by the processor, a background media resource set which includes at least one feature word from among the acquired at least one respective feature word;

clustering, by the processor, the generated background media resource set; and calculating, by the processor, the clustering similarity between each media resource included in the background media resource DB and the current media resource by using a result of the clustering of the background media resource set.

16. The method of claim 9, wherein the providing of the media resource recommendation list comprises adjusting at least one first weight of the feature word weight matrix based on a user input that relates to the media resource recommendation list.

17. A non-transitory computer-readable recording medium having recorded thereon a program which includes commands for executing the method of claim 9.

* * * * *